(12) United States Patent
Bassirat

(10) Patent No.: US 6,507,741 B1
(45) Date of Patent: Jan. 14, 2003

(54) RF REPEATER WITH DELAY TO IMPROVE HARD HANDOFF PERFORMANCE

(75) Inventor: Farhad Bassirat, Plano, TX (US)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 08/992,588

(22) Filed: Dec. 17, 1997

(51) Int. Cl.⁷ .................................................. H04Q 7/22
(52) U.S. Cl. ...................... 455/440; 455/456; 455/18; 455/15
(58) Field of Search ........................... 455/7, 11.1, 12.1, 455/18, 436, 37, 40, 456, 443; 375/211; 370/279, 280, 281, 293, 320, 335, 342

(56) References Cited

U.S. PATENT DOCUMENTS

| | | | |
|---|---|---|---|
| 4,056,780 A | * 11/1977 | Faulkner | 325/5 |
| 4,475,246 A | * 10/1984 | Batlivala et al. | 455/18 |
| 5,239,666 A | * 8/1993 | Truby | 455/9 |
| 5,260,943 A | * 11/1993 | Comroe et al. | 370/332 |
| 5,377,255 A | * 12/1994 | Beasley | 379/58 |
| 5,394,158 A | * 2/1995 | Chia | 342/457 |
| 5,508,708 A | * 4/1996 | Ghosh et al. | 342/457 |
| 5,613,205 A | * 3/1997 | Dufour | 455/440 |
| 5,652,765 A | * 7/1997 | Adachi et al. | 375/211 |
| 5,848,063 A | * 12/1998 | Weaver, Jr. et al. | 370/33.1 |
| 5,930,293 A | * 7/1999 | Dufour | 455/440 |
| 6,122,513 A | * 9/2000 | Bassirat | 455/443 X |

* cited by examiner

Primary Examiner—William Trost
Assistant Examiner—Philip J. Sobutka
(74) Attorney, Agent, or Firm—Carr Law Firm, L.L.P.

(57) ABSTRACT

An RF repeater having a fixed or adjustable time delay inserted in the reverse path and/or forward path of the RF repeater is used in a first cell for improving hard handoff performance from the first cell to a second cell. Certain factors associated with the CDMA hard hand-off process effectively reduce the coverage area of the first cell, including the round-trip delay (RTD) uncertainty, the time needed to perform the hard hand-off process, and a higher forward link $E_b/N_o$ requirement. Use of an RF repeater in accordance with the increases the effective coverage area of the first cell. The delayed signal from the RF repeater also allows the base station to determine the location of the subscriber station thereby identifying the particular adjacent cell to which the subscriber station will be switched (hard hand-off). A collocated base station is no longer required for the hard hand-off process and the utilization of beacons (when the source cell and the destination cell operate at different channel frequencies) is eliminated. The present invention further includes a method of adding a delay, using an RF repeater, to the reverse path and/or forward path signal(s) between a subscriber station and a base station.

32 Claims, 10 Drawing Sheets

RF REPEATER WITH DELAY TO IMPROVE HARD HANDOFF PERFORMANCE

TECHNICAL FIELD

The present invention relates in general to radio frequency (RF) communications systems and, in particular, to an RF repeater with a delay to improve hard handoff performance between cells and method therefor.

BACKGROUND

Throughout the world, certain RF bands have been allocated for various types of communications, including personal communications system (PCS), cellular, and other mobile applications. In the United States, the Federal Communications Commission (FCC) has allocated frequency bands in the range of 824–849 and 869–894 MHz; and 1850–1910 and 1930–1990 MHz for such applications. Currently, the 824–849 and 869–894 MHz bands are used for mobile cellular communications and the 1850–1910 and 1930–1990 MHz bands are used for PCS applications. Other countries utilize their own frequency spectrum for such applications.

Within each service provider's allocated band and geographic area (usually there are two or more service providers in a geographic area using a different portion of the spectrum), the service provider may utilize any type of technology including frequency division multiple access (FDMA), time division multiple access (TDMA), code division multiple access (CDMA), or combination thereof.

Frequency division multiple access (FDMA) technology utilizes narrow and discrete channels within the frequency band. Different subscriber stations are assigned different frequency channels. Interference to and from adjacent channels is limited by the use of bandpass filters which pass the signal energy within the narrow channels while rejecting signals having other frequencies. The United States cellular system (AMPS) divides the allocated spectrum into 30 KHz bandwidth channels and uses FM modulation.

Time division multiple access (TDMA) technology also utilizes narrow and discrete channels within the frequency band. However, each channel is further divided into time slots in the time domain. This results in multiple users on the same frequency channel and increases the number of users per given channel.

Unlike FDMA or TDMA, code division multiple access (CDMA) involves multiple users simultaneously sharing a channel having a relatively wide bandwidth. United States CDMA standards (IS-95) currently specify a CDMA channel having a bandwidth of 1.25 MHz. In CDMA, a large number of signals share the same frequency spectrum. Each signal consists of a different pseudorandom binary sequence that modulates a carrier signal (at the center frequency of the channel's spectrum). This spreads the spectrum of the waveform over the entire channel bandwidth. Use of CDMA technology allows for a larger number of signals than that used in FDMA or TDMA within the same amount of frequency spectrum and geographic area. Use of CDMA technology by service providers is expected to grow due to its increased traffic capabilities, digital technology and security. The PCS and cellular systems were initially designed and deployed with FDMA or TDMA technology (or a specific standard such as AMPS). Because no additional frequency spectrum has been allocated by the FCC in the cellular band, cellular band service providers desiring to use CDMA technology are now integrating CDMA technology into existing systems and must utilize the same frequencies currently allocated.

Typically, service providers in PCS, cellular and other mobile applications divide the particular geographic region in which they are operating into "cells". This concept is well-known in the industry. Each cell contains a base station (including a transmitter and receiver) and services subscriber users within the boundaries of the cell. Each service provider is free to design its own coverage system including the locations and sizes of its cells.

In FDMA and TDMA, adjacent cells must use channels having different frequencies to avoid interference (a re-use factor of K=7 is traditionally used). When a subscriber station moves from one cell to an adjacent cell, a new communications channel between the subscriber station and the base station in the adjacent cell must be established. The communications channel between the subscriber station and the base station in the original cell is then terminated. This process is known as a "hand-off", and is more particularly described as a "hard" hand-off because the process requires switching frequency.

In CDMA technology, however, each cell may use all or any portion of the frequency spectrum allocated to the service provider. Therefore, the same frequency channel (i.e., $f_1$) may be used in adjacent cells. This increases the number of users within a particular cell and geographic area.

One of the fundamental features of the CDMA cellular technology is the use of a "soft" hand-off process. A soft hand-off occurs when a subscriber station travels from one cell to an adjacent cell with both cells operating at the same channel frequency. In the soft hand-off process, a subscriber station establishes a communications link to an adjacent cell before breaking off communications with the original cell. In most cases, the subscriber station maintains its link for a period of time to both the base station of the original cell and the base station of the adjacent cell. In some cases, the subscriber station may be in the soft hand-off process and communicate with more than two base stations. For the soft handoff to work, it is necessary that the two base stations (or more) involved use the same channel frequency.

A single CDMA channel frequency may not be sufficient to provide service in some areas of the overall service area. Where the need for service is high, the number of channel frequencies must also increase. If the additional channel frequencies cover all cells of the service area, then the subscriber station will keep the same channel frequency while it moves from cell to cell within the service area. However, adding additional channel frequencies to each cell may not be desirable because some cells may not need the increased capacity. Accordingly, some cells that experience high traffic may require one or more additional channel frequencies. This results in a condition where a subscriber station may be required to switch its channel frequency when moving from one cell (i.e. using channel frequencies $f_1$ and $f_2$) to an adjacent cell (i.e. using only channel frequency $f_1$). When the subscriber station is communicating with the cell using channel frequency $f_2$ and moves to the adjacent cell, the soft hand-off process is no longer viable since the subscriber station cannot transmit simultaneously at the two different frequencies needed to communicate with the two base stations. When the soft hand-off process cannot be used, the subscriber station must break from one base station (operating at $f_2$), switch frequency to the new channel frequency ($f_1$), and establish the link with a new base station (operating at $f_1$) operating within the original cell. This process is known as a "hard" hand-off. After the hard hand-off is completed, then the soft hand-off process may be used when the subscriber station (now using channel frequency $f_1$) moves from the original cell to the adjacent cell (using channel frequency $f_1$).

The problem with this type of hard hand-off is that the effective coverage area of the CDMA source cell is reduced due to several factors. First, the hard hand-off process may take up to five (5) seconds to complete. Assuming that the subscriber station's velocity may be up to seventy (70) m.p.h. and directly away from the base station of the source cell, then the subscriber station may travel approximately 156 meters from the initiation of the hard hand-off process until the process is completed. Second, adding the round trip delay (RTD) uncertainty of about 244 meters, then the subscriber station must be approximately 400 meters or more away from the edge of the cell coverage area when the hard hand-off process is triggered.

In addition, in the case as described above where the subscriber station switches from the channel $f_2$ to the channel $f_1$ within the source cell (hard hand-off) and then uses a soft hand-off to the adjacent cell, there is no soft hand-off gain for the subscriber station that is going to hard hand-off to the collocated base station operating at $f_1$. As recalled earlier, the soft hand-off process results in the subscriber station communicating simultaneously with at least two cells (the source cell and the likely destination cell) and perhaps other cells (additional cells near the subscriber station). Near the cell boundary the subscriber station is receiving separate, but identical, communication signals from the two or more cells resulting in a multi-path increase in the strength of the received signal. Therefore, the forward link $E_b/N_o$ requirement is lower allowing a reduction in power of the forward link signals for the same coverage area. However, when the subscriber is operating at $f_2$, there is no soft hand-off gain because the subscriber will not be experiencing any multi-path increase in the signal strength. This results in a higher forward link $E_b/N_o$ requirement and lowers the effective coverage area of the source cell. The amount of reduction depends on a number of factors and ranges from a low of about 0 dB to as high as 15 dB with an average estimate of about 5 dB. This means that the effective coverage area of the source cell (operating at $f_2$) is roughly about 5 dB smaller.

The combination of a hard hand-off to a collocated base station within the source cell and then a soft hand-off to the adjacent cell is one method of lessening some of the foregoing problems, however, it has several disadvantages. One disadvantage is the increased cost of an additional and collocated base station in the source cell. This method currently provides for the subscriber station to switch to a collocated base station (BTS).

Another disadvantage is that the source cell BTS (after achieving a hard handoff from the other source cell BTS) may not be found and detected by the subscriber station resulting in hand-off failure and call drops. This problem is aggravated in multi-sector cells. There are a number of adjacent cells and/or sectors (within a cell) but only the collocated BTS is the one which should be used as the destination BTS. If this BTS is not detected by the subscriber station, the call will drop and the hand-off fails. Furthermore, in order to achieve customer satisfaction and normally complete handoffs, the collocated source cell BTS must save a certain forward link transmit power and resources to allow switching to its channel frequency so the subscriber stations can perform the hand-off process using that particular channel frequency. All of this causes a heavy penalty on the network and its capacity.

Another disadvantage of the foregoing method is that the destination BTS must allocate a large amount of forward link transmit power to the subscriber station because it is near the cell edge of the source cell (and relatively far away from the BTSs) where the hard hand-off is triggered. Because of the distance between the destination BTS and the subscriber station, and in order to communicate, a relatively large amount of forward link transmit power to the subscriber station is required. This decreases the forward link capacity of the BTS to which the subscriber station hands-off.

In another case, a provider's service may be deployed in a fashion (no ubiquitous channel frequency within the source and destination cell) such that a subscriber station when moving from one cell operating only at one channel frequency (i.e., $f_2$) to an adjacent cell operating at a different channel frequency (i.e., $f_1$) must switch frequency. In this case, the effective coverage area of the source cell is also negatively impacted as described above.

To eliminate some of these disadvantages, one method utilizes an additional collocated base station. The subscriber station hands off to the collocated base station through a hard hand-off process. One method that does not require the use of the additional collocated base station uses beacons or the like. This method may lessen some of the foregoing problems, however, it is expensive and also suffers from some of the same disadvantages as described above, such as decreased forward link capacity, the uncertainties in finding the destination base station and wasteful allocation of resources.

In addition to the CDMA-to-CDMA hard hand-off process, a hard hand-off is also used when a subscriber station switches from CDMA to AMPS (FDMA or TDMA). This requires not only switching frequency, but also the mechanism of communication. Further, a hard hand-off is also used in all FDMA or TDMA when the subscriber station is required to switch frequencies when moving from one cell to another cell.

As clearly illustrated, the current methods of CDMA hard hand-off adversely impact the CDMA hard hand-off performance of the source cell when a subscriber station requires a hard hand-off from the source base station to the destination collocated base station. This adverse impact effectively reduces the effective coverage area of the source cell. Cells in high traffic urban areas are generally small (i.e., between 1 and 2 kilometers in diameter). The reduction in cell coverage area caused by the hard hand-off process does not leave much coverage area for use in the source cell. This increases the cost to provide service.

Accordingly, there exists a need for a system and method that improves CDMA hard hand-off performance from CDMA cell to CDMA cell, or from CDMA cell to another cell that uses different technology (AMPS, GSM, FDMA, TDMA, etc.).

SUMMARY OF THE INVENTION

According to the present invention, there is provided an RF repeater for use in a cell to improve hard hand-off performance. The RF repeater includes an input/output terminal for receiving a first signal from a subscriber station. A predetermined amount of delay is added to the received first signal and the delayed signal is output for transmission to a base station. In another aspect of the present invention, there is provided an RF repeater that includes an input/output terminal for receiving a first signal from a base station. A predetermined amount of delay is added to the received first signal and the delayed signal is output for transmission to a subscriber station.

The added delay distinguishes the RF repeater signal from the signal received directly from the subscriber station and allows the base station to determine the approximate location of the subscriber station (i.e., within the coverage area of the RF repeater and near the cell boundary for initiation of the hard hand-off process).

In another embodiment of the present invention, there is provided an apparatus for delaying an RF signal between a subscriber station and a base station for improving hard hand-off performance between a first cell and a second cell. The apparatus includes an RF repeater, operable with a base station within a first cell, for receiving an RF signal from a subscriber station and for transmitting the RF signal to the base station. A predetermined amount of delay is added to the RF signal (in the reverse path). In another aspect, the RF repeater receives an RF signal from a base station and transmits the RF signal to a subscriber station. A predetermined amount of delay is added to the RF signal (in the forward path).

In another aspect of the present invention, there is provided a communications cell having a base station emitting a base station signal for communicating with a subscriber station within a predetermined geographic area. An RF repeater operable with the base station and located proximate a boundary of the predetermined geographic area is included and has a terminal for receiving a first signal from the subscriber station. A predetermined delay is added to the first signal and the delayed signal is output for transmission to the base station.

In yet another aspect of the present invention, a method is provided that improves hard hand-off performance from a first cell to a second cell. An RF repeater operable with a base station receives a first signal from a subscriber station. The received first signal is delayed by a predetermined amount of time and the delayed first signal is output for transmission to the base station. Similarly, the delay may be added to the forward path.

In another aspect of the invention, there is provided a method of defining the location of a subscriber station located within a cell or near the boundary of the cell. The method includes the step of receiving at a radio frequency (RF) repeater operable with a base station of the cell a first signal from a subscriber station. A predetermined amount of delay is added to the first signal and output for transmission to the base station. The base station receives the delayed first signal from the RF repeater and determines the location of the subscriber station from the received delayed first signal.

BRIEF DESCRIPTION OF THE DRAWINGS

For a more complete understanding of the present invention, and the advantages thereof, reference is made to the following description taken in conjunction with the accompanying drawings, wherein.

DETAILED DESCRIPTION OF THE INVENTION

Figure 1:
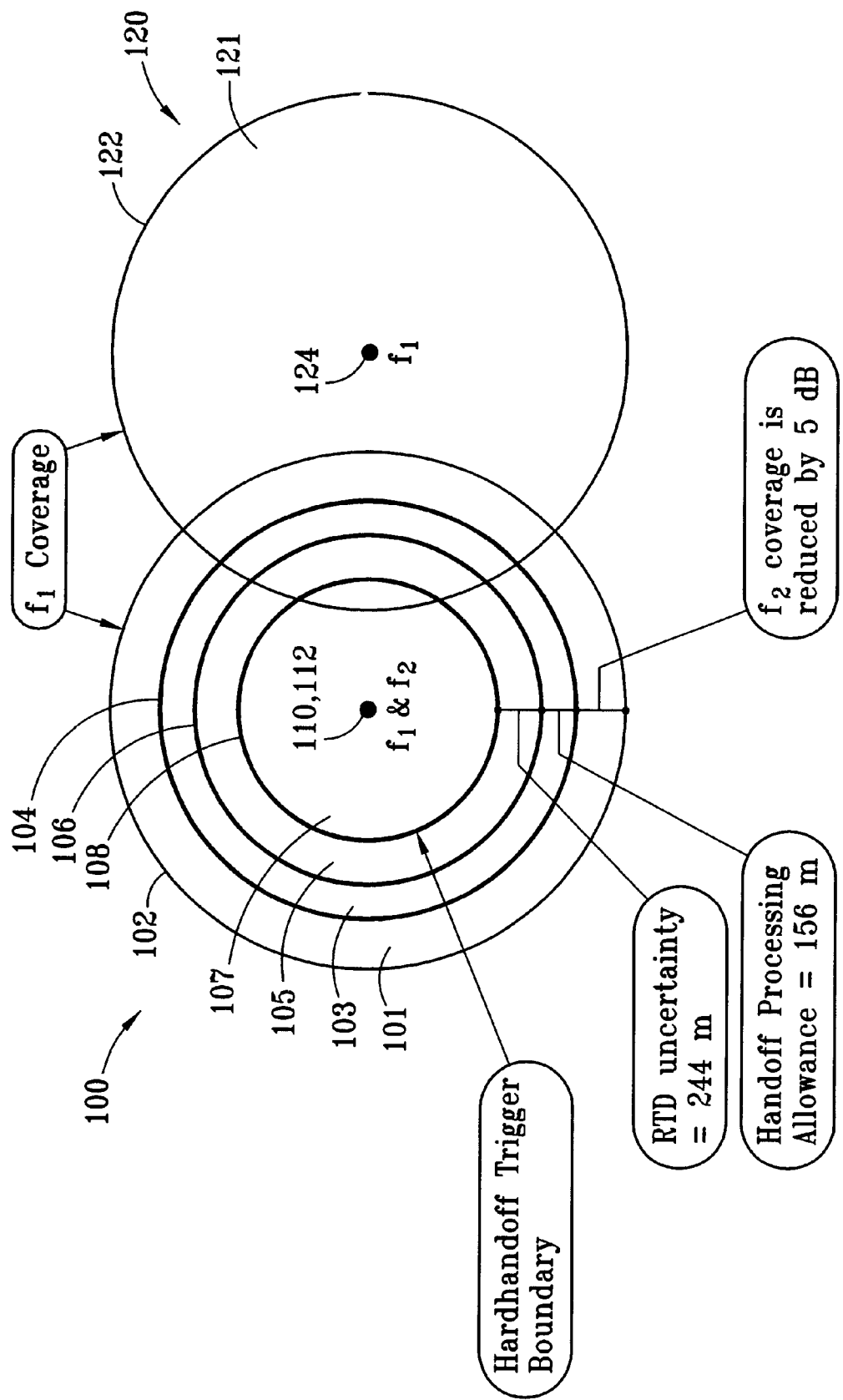
FIG. 1 is a diagram illustrating a reduction in cell coverage area caused by various factors.

With reference to the drawings, like reference characters designate like or similar parts throughout the drawings.

Now referring to FIG. 1, there is illustrated the effective coverage area reduction caused by the three factors identified in the Background section, supra. The cell 100 includes an original coverage area 101 as defined by a boundary identified by reference numeral 102. Two base stations 110, 112 within the cell 100 operate at channel frequencies $f_1$ and $f_2$, respectively. An adjacent cell 120 includes a coverage area 121 as defined by another boundary identified by reference numeral 122 and a base station 124 operating at channel frequency $f_1$. Taking into account the increased forward link requirement, the original coverage area 101 of the cell 100 is reduced to an effective coverage area 103 that is now defined by the boundary identified by reference numeral 104. Taking into account the time to initiate and complete the hard hand-off process, the effective coverage area is again reduced to a coverage area 105 and is defined by the boundary identified by reference numeral 106. Now taking into account the RTD uncertainty, the effective coverage area is once again reduced to a coverage area 107, and is now defined by the boundary identified by reference numeral 108. As will be appreciated, FIG. 1 is an illustration of the reduction in coverage area and is not necessarily to scale. It will also be understood that the cell boundaries 102, 104, 106, 108, and 122 may shift or change (are not static) resulting in coverage area(s) that may shrink or grow, depending on operating conditions.

Figure 2:
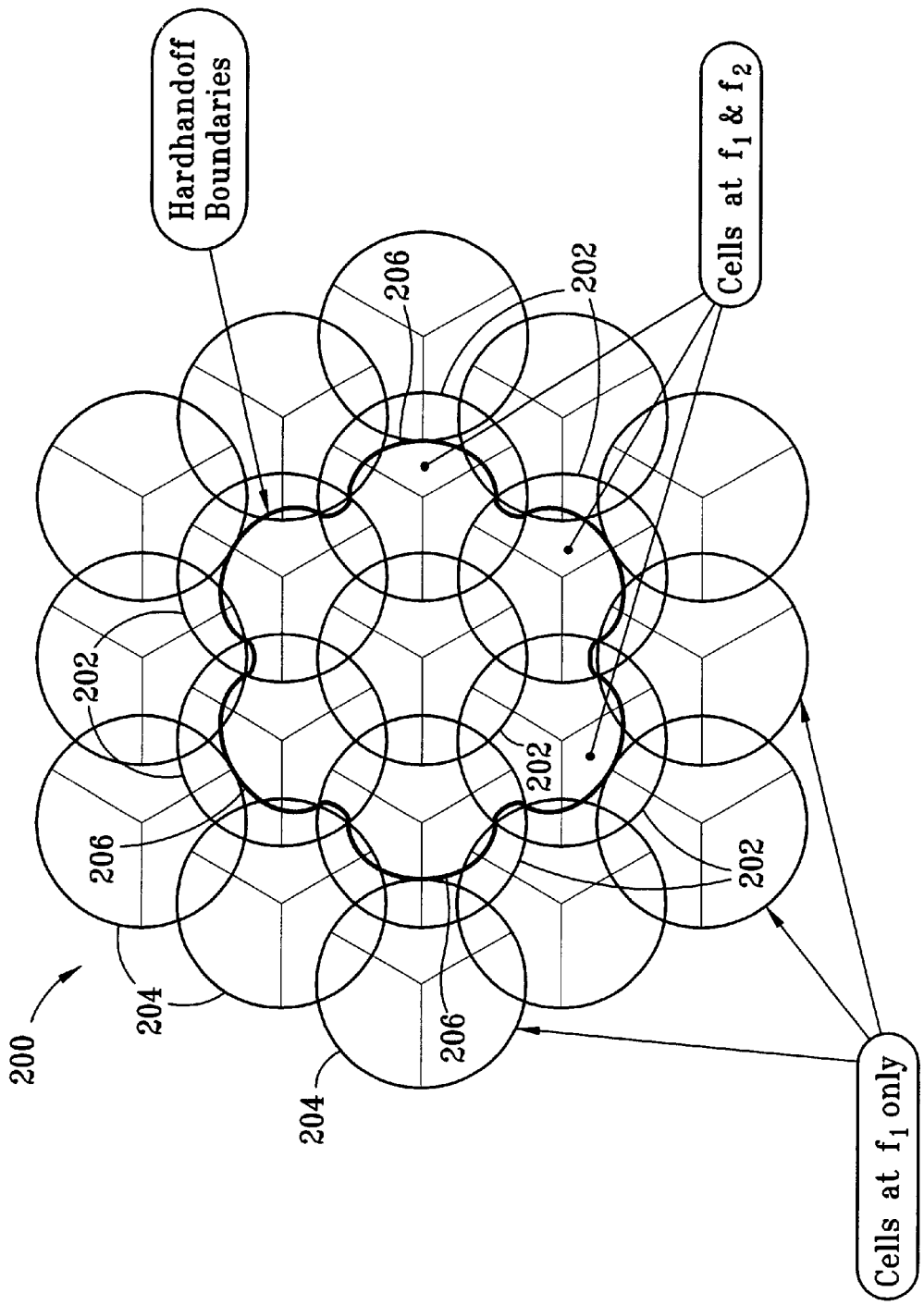
FIG. 2 is a diagram illustrating one example of an overlay cell configuration.

Now referring to FIG. 2, there is shown an example of a CDMA cell configuration 200 that may be utilized by a service provider. The configuration 200 includes a group of CDMA cells 202 (seven adjacent cells are illustrated) operating with channel frequencies $f_1$ and $f_2$. The group of cells 202 are bounded by a second group of cells 204 (twelve cells adjacent the group of cells 202 are illustrated) operating with channel frequency $f_1$. The channel frequency $f_1$ is ubiquitous within the coverage area defined by the cells 202 and 204 while the channel frequency $f_2$ is deployed and limited to the coverage area defined by the cells 202. As will be appreciated, each of the cells 202 includes a first base station (not shown) operating at channel frequency $f_1$ and a second base station (not shown) operating at channel frequency $f_2$, while each of the cells 204 includes a base station (not shown) operating at channel frequency $f_1$. It will be understood that all, some or none of the cells 202 and 204 may be provisioned for sectorized operation (e.g., bisector, trisector, etc.).

During operation, a subscriber station located within one of the cells 202 is communicating with the cell's base station using the channel frequency $f_2$. As the subscriber station moves toward one of the cells 204, it will eventually reach a hard hand-off boundary 206. As the subscriber station leaves the group of cells 202 and travels to one of the cells 204, a hard hand-off is needed whereby the subscriber station switches operation from channel frequency $f_2$ to channel frequency $f_1$. This process has been described above, and further with reference to FIG. 1. The hard hand-off boundary 206 is the approximate location where the hard hand-off process is initiated when the subscriber station is traveling towards one of the cells 204. It will be understood that the cell boundaries for each of the cells 202 and 204, and the hard-hand-off boundary 206, may slightly shift or change (are not static) resulting in coverage area(s) that may shrink or grow, depending on operating conditions.

Figure 3:
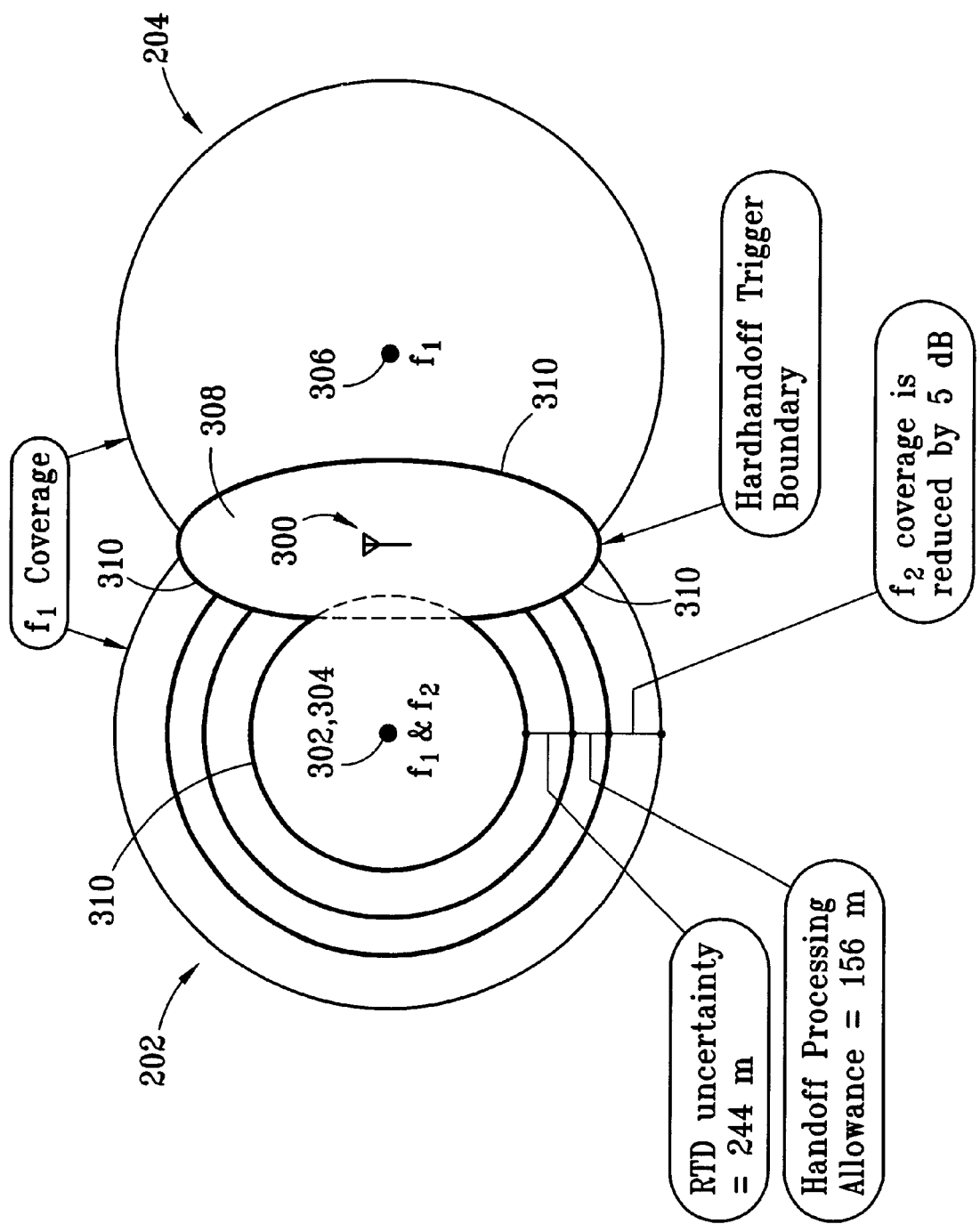
FIG. 3 is a more detailed diagram of two cells shown in FIG. 2.

Now referring to FIG. 3, there is illustrated one of the cells 202 (with its effective coverage areas, as illustrated in FIG. 1) and one of the cells 204. The cell 202 has an RF repeater 300 deployed within the coverage area of the cell 202. The cell 202 includes a first base station (BTS) 302 operating at channel frequency $f_2$ and a second base station 304 operating at channel frequency $f_1$, while the cell 204 includes a base station 306 operating at channel frequency $f_1$.

The present invention provides the RF repeater 300 for use as illustrated in FIG. 3. The RF repeater 300 operates in conjunction with the base station 302 and provides a coverage area 308. After taking into account the factors that reduce the coverage area of cell 202 during the hard hand-off process, the effective coverage area of the cell 202 with utilization of the RF repeater 300 is extended and defined by a boundary identified by reference numeral 310. Accordingly, use of the RF repeater 300 produces the hard hand-off boundary 310 between the cell 202 and the cell 204 at which the hard hand-off process occurs. This results in an increase in the effective coverage ares of the cell 202, as illustrated in FIG. 3.

The present invention RF repeater 300 offsets the problems incurred in the hard hand-off process as explained above. Boundary cell shrinkage due to high $E_b/N_o$ requirement, hard hand-off processing, and RTD uncertainties is alleviated. In fact, the RF repeater 300 increases the cell coverage area.

In general terms, an RF repeater acts as an intermediary between a base station and a subscriber station. For the forward link, the RF repeater receives the transmitted base station signal over a wireless or wire (such as a coaxial or fiber optic cable) interface and re-transmits the base station signal over an antenna. For the reverse link, the RF repeater receives the subscriber station signal and re-transmits the subscriber station signal to the base station.

The present invention provides that the RF repeater 300 include a time delay for delaying the received subscriber station signal by an amount of time $\tau$ prior to transmission to the base station 302. The delay time $\tau$ may be adjusted depending on the deployment requirement of the cell 202 and the system. The delay time $\tau$ through the RF repeater 300 is adjustable and/or programmable.

Figure 5A:
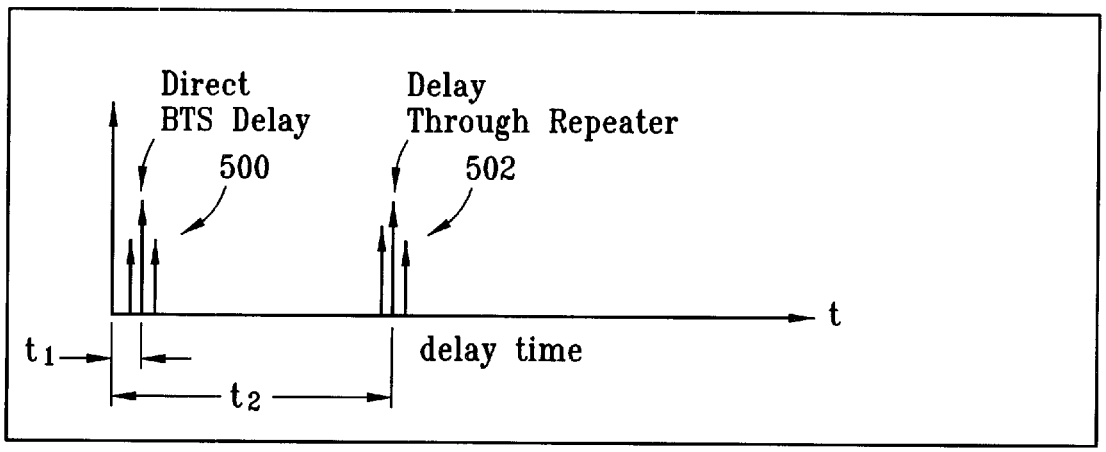
FIG. 5a is a graph showing a direct signal and a repeater signal from an RF repeater in accordance with the present invention received by a base station.

Referring now to FIG. 5a, there is illustrated a graph utilizing the time domain and showing the two signals received by the base station 302. A direct signal 500 received from the subscriber station has a time delay equal to t1. The delay time t1 represents the round trip delay measured from the time of transmission of the base station signal to the subscriber station to the time of reception by the base station of a corresponding signal from the subscriber station. A repeater signal 502 received from the RF repeater 300 has a time delay equal to t2. The delay time t2 represents the round trip delay, however in this case, the round trip delay includes the actual round trip delay plus the delay time $\tau$ of the RF repeater 300. The delay time t2 may be adjustable or programmable by the delay time $\tau$. As will be appreciated by those skilled in the art, the base station 302 includes the capability of distinguishing the signals 500 and 502 by using the time delays t1 and t2 for each of the signals 500 and 502, respectively. From this information, the base station 302 determines that the subscriber station is near the RF repeater 300 and near the hard hand-off boundary 310 to cell 202.

In the preferred embodiment, the hard hand-off process is initiated when the strength of the delayed signal (received from the RF repeater) is greater (preferably, at least about 6 dB) than the strength of the direct signal (received directly from the subscriber station). As will be appreciated, the 6 dB figure is used to ensure that the subscriber station is closer to the RF repeater 300 and not in the middle area between the base station 302 and the RF repeater 300. This figure may also depend on the coverage area of the RF repeater 300 and its effective radiated power (ERP) as well as other operating conditions.

Figure 5B:
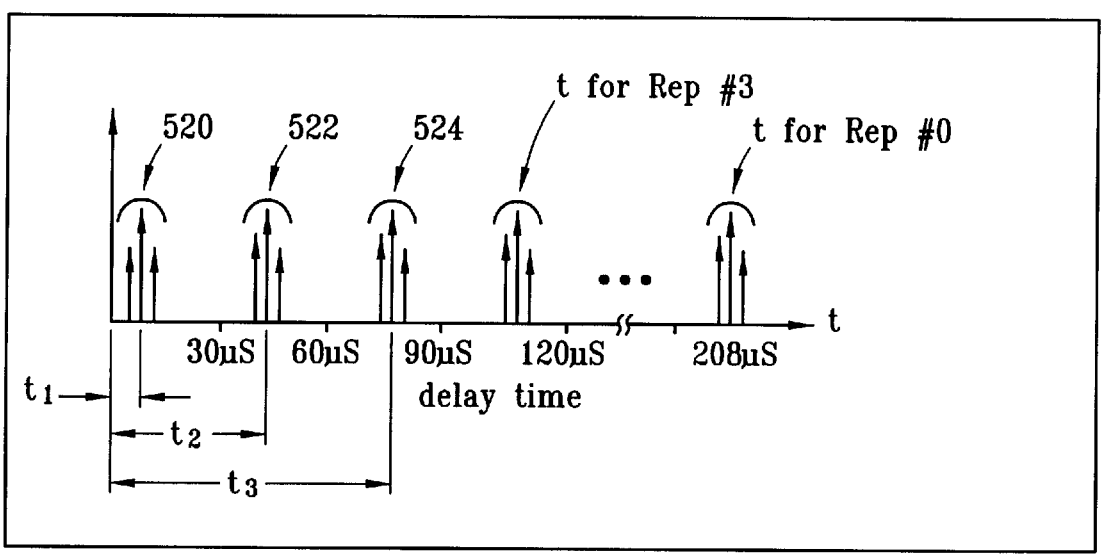
FIG. 5b illustrates signals received by a base station utilizing a plurality of RF repeaters in accordance with the present invention.

Now referring to FIG. 5b, there is illustrated an example of the signals received by a base station where a plurality of RF repeaters are utilized in a cell whereby each RF repeater has a different time delay. A direct signal 520 received from the subscriber station has a time delay equal to t1. A first repeater signal 522 received from a first RF repeater has a time delay equal to t2. A second repeater signal 524 received from a second repeater has a time delay equal to t3, and so on, as illustrated in FIG. 5b. Each RF repeater includes a different delay time $\tau$ which results in different delay times t2, t3, etc. From the amount of time delay for each signal, a base station may determine the location of the subscriber station, i.e, the subscriber station is near which RF repeater.

With this delay information, a base station is able to determine and measure the signal which is coming from the RF repeater. If the following conditions apply, then the base station 302 will trigger the hard hand-off process. First, the subscriber station must be located within a boundary cell (such as 202). A boundary cell is a cell beyond which no service is provided at that particular channel frequency (as illustrated in FIG. 3—$f_2$). Second, the base station 302 must detect a usable multipath signal (the RF repeater signal) that has a RTD (round trip delay) greater than a predetermined value $\tau_{rep}$. In other words, the RTD must be greater than a set value, using the delay value of $\tau_{rep}$. Third, the base station 302 must measure the delayed signal (from the RF repeater) as the strongest signal versus any other signal that it receives from the subscriber station. Fourth, the subscriber must report that all non-boundary sector pilot powers have fallen below a T_drop value. If the four conditions are met, then the base station 302 should hard hand-off to the adjacent neighbor cell 204. Since the location of the RF repeater 300 is known, the identity of the destination cell (and base station) is also known. Accordingly, the use of the RF repeater 300 allows a simple determination as to which adjacent cell the subscriber station will be switched. As will be appreciated, this information is transmitted from the base station to a mobile switch center (MSC) (not shown) that coordinates the hard hand-off process.

However, if the second and third conditions do not apply (such as for the case that the subscriber station is in the shadow of the RF repeater) while the first and fourth conditions do apply, and an RTD value for the subscriber station is measured that is greater than a set value of $\tau_{dir}$ and is less than $\tau_{rep-set}$, then the base station should assume that the subscriber station is within and close to the cell boundary, and is in the shadow of the RF repeater, then the base station 302 will trigger the hard hand-off to the collocated base station 304 (and then use a soft hand-off to the cell 204).

The RF repeater 300 of the present invention performs at least three major functions. It intentionally adds a time delay to the reverse path. As such, the amount of time delay may be set to a value so that the RF repeater signal received by the base station 302 is distinguishable from direct signals. Second, the RF repeater 300 works as a cell extender and will extend the cell boundary of the cell 202. The aforementioned penalty associated with the hard hand-off process of shrinkage of the effective cell boundary (decrease of about 400 meters) does not apply as it did before. While the decrease in the effective cell boundary (about 400 meters) for purposes of a hard hand-off still applies, it applies to the extended cell edge, and not from the original cell edge. Moreover, the RF repeater 300 also improves the forward link requirement (about 5 dB reduction in cell coverage area) of the cell. Since the RF repeater 300 operates as a cell extender, it extends the cell coverage area thereby compensating for the 5 dB drop in the coverage area.

Another improvement achieved is that all the subscriber stations operating near the original cell edge will communicate to the base station 302 at a lower transmit power. This improves the forward link capacity of the base station 302 and reduces the subscriber station transmit power.

Figure 4A:
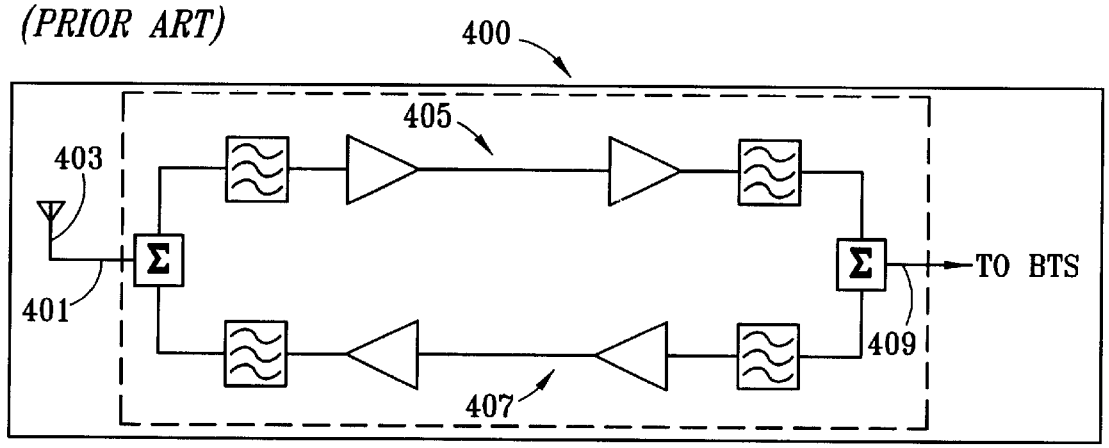
FIG. 4a is a block diagram of a prior art RF repeater.

Now referring to FIG. 4a, there is illustrated an overall block diagram of a prior art RF repeater 400. The RF repeater 400 includes an input/output terminal 401 for receiving a subscriber station signal (and transmitting a base station signal) and reverse path circuitry 405 and an input/output terminal 409 for re-transmitting (or sending) the subscriber station signal to a base station (BTS). The input/output terminal 401 receives the subscriber station signal from an antenna 403 or from any other transmission or reception means such as coaxial cable, fiber optics cable, infrared transmission, etc. (the repeater, as such, may or may not have an antenna). This signal path is commonly referred to as the reverse link or reverse path. The input/output terminal 409 of the RF repeater 400 is used to transmit (or send) the received subscriber station signal over a wireless or wire (such as a coaxial or fiber optic cable) interface or media (not shown) to the base station. For the forward link or forward path, the RF repeater 400 receives a base station signal over the interface and re-transmits the base station signal to the antenna 403 for transmission to the subscriber station. The RF repeater 400 also includes forward path circuitry 407. As will be appreciated, communications between a base station and a subscriber station include two communications signals on two different channel frequencies (both a forward and reverse.

FIG. 4a illustrating the RF repeater 400 is simplified and not all the hardware and software components are shown. As will be appreciated, there are several types of RF repeaters available from manufacturers such as Andrews, Ortel, Allgon, Repeater Technologies, Allen Telecom, and others. The present invention relates to all RF repeaters which are used for repeating signals.

The present invention provides an RF repeater having a time delay inserted in the forward path and/or a delay in the reverse path.

Figure 4B:
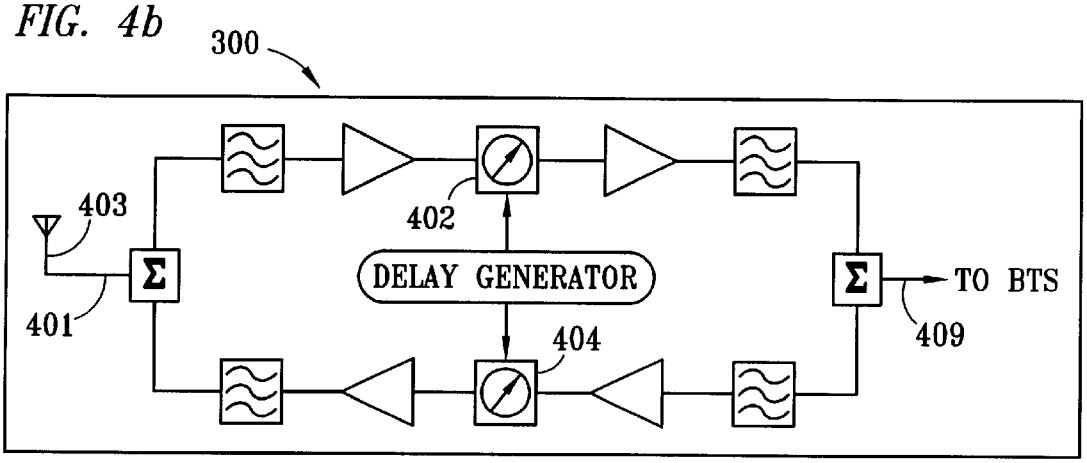
FIGS. 4b–4d are block diagrams of the RF repeater of the present invention illustrating three embodiments of the RF repeater.
Figure 4C:
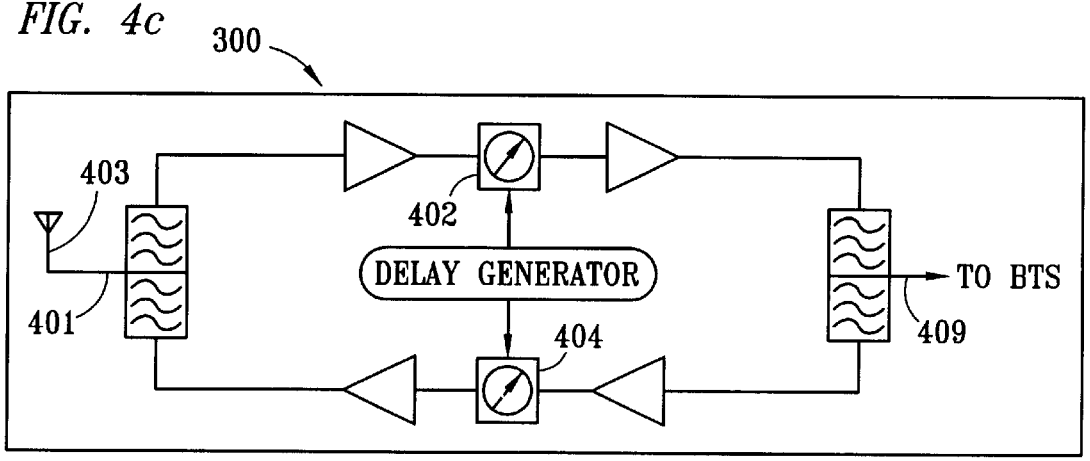
Figure 4D:
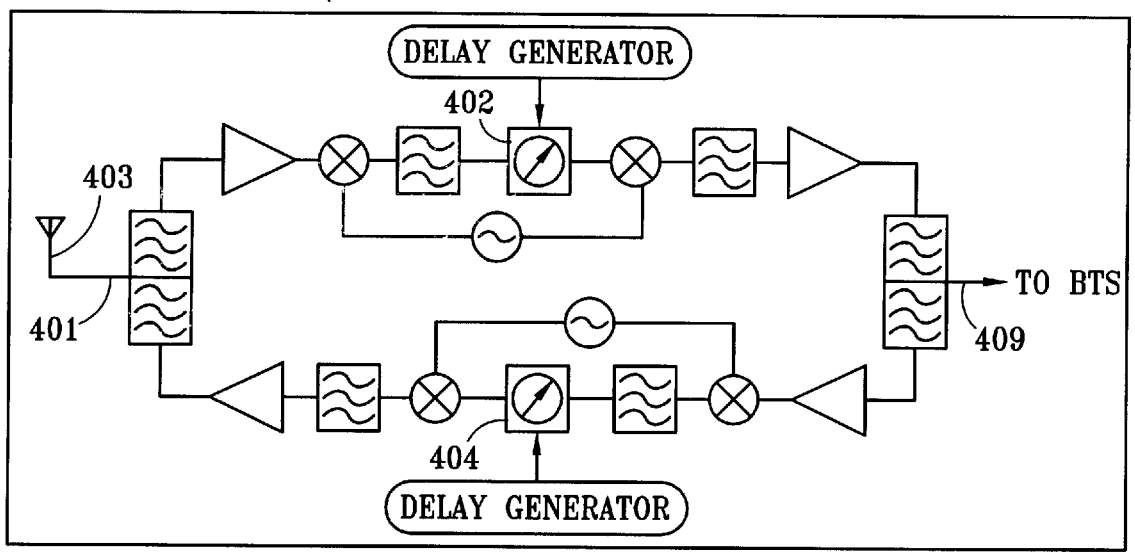

Now referring to FIGS. 4b through 4d, there are illustrated several embodiments of the RF repeater 300 in accordance with the present invention.

In FIG. 4b, the RF repeater 300 is illustrated in a configuration where channel selectivity and combining mechanisms are separated. A first delay generator 402 for generating a time delay $\tau 1$ in the reverse path of the RF repeater 300 is provided. The RF repeater 300 also includes a second delay generator 404 for generating a time delay $\tau 2$ in the forward path. The total time delay $\tau$ added to the round trip delay is the sum of the time delay $\tau 1$ and the time delay $\tau 2$. In essence, the time delay of the signal received from the RF repeater effectively "marks" the subscriber station. This informs the base station that the subscriber is at, or approaching, the hard hand-off point to the adjacent cell.

It will be understood that only one path may be delayed or both paths may be delayed, and/or one of the delay generators 402, 404 may be set at zero delay. In addition, multiple delay generators 402, 404 may be used at different points in the path(s). The amount of total time delay $\tau$ added to the RF repeater 300 may depend on the cell size (if the cell is larger, a larger delay time should be added) and the number of RF repeaters in the cell (if two more are used then the delay times should be different for each RF repeater).

In FIG. 4c, the RF repeater 300 is illustrated in a configuration where the RF repeater 300 utilizes combiner circuitry. The RF repeater 300 includes the first delay generator 402 and the second delay generator 404. In FIG. 4d, the RF repeater 300 is illustrated in a configuration where the RF repeater 300 utilizes up/down conversion circuitry. The RF repeater 400 includes the first delay generator 402 the second delay generator 404.

The delay generators 402, 404 delay the signals within the reverse path and the forward path, respectively, of the RF repeater 300. The delay generators 402, 404 may be designed using any circuitry that would result in delaying the signal(s). The delay generators 402, 404 may include transmission lines or cables at IF or RF frequencies, PIN phase shifters and switches, SAW tap delay lines, normal delay lines or integrated circuits at IF frequencies, digital delays and/or filters, software, etc., any combination thereof, or any other circuitry or methods known to those skilled in the art for time delaying a signal. The delay generators 402, 404 may be designed to be adjustable or programmable to allow the amount of delay to be changed (or different fixed delays may be used for different RF repeaters) the design of which is known to a person of ordinary skill in the art.

The present invention provides a means for adding a fixed or adjustable delay to the forward path and/or the reverse path of an RF repeater. It will be understood that the delay generators 402, 404 may be located at any point in the reverse path or the forward path, as desired. As will be appreciated, some RF repeaters may only repeat or extend one of the paths. As such, a delay generator may be similarly used for such single path RF repeaters.

Preferably, the delay is added to the reverse path. The reason for this is because the search window specification for the base station (reverse path) is longer than the search window specification for the subscriber stations (forward path). If too much delay is added to the forward path, communication may be disrupted. Currently, a subscriber station has a search window of approximately 22 microseconds. This relatively shorter search window is due to operating conditions requiring the subscriber station to communicate with, and search for, several different base stations simultaneously. The base station search window for some systems, however, is about equal to two (2) Walsh symbols wide, or equivalent to about 416 microseconds. This allows the base station to detect a delayed signal having a RTD of up to about 416 microseconds. However, in some applications, a base station may only have the capability to successfully use a delayed signal having a delay equal to one (1) Walsh symbol or about 208 microseconds, which is still quite wide. Accordingly, multipath signals (i.e, delayed signals) which are less than 208 microseconds apart from each other may be successfully decoded and combined by the base station.

In general terms, a typical total round trip delay without using an RF repeater in accordance with the present invention is about 10–20 microseconds (assuming over the air delay only) when the subscriber station is at a distance of about one kilometer from the base station. For every additional kilometer of distance about 6 microseconds should be added to determine an approximate round trip delay.

Figure 4E:
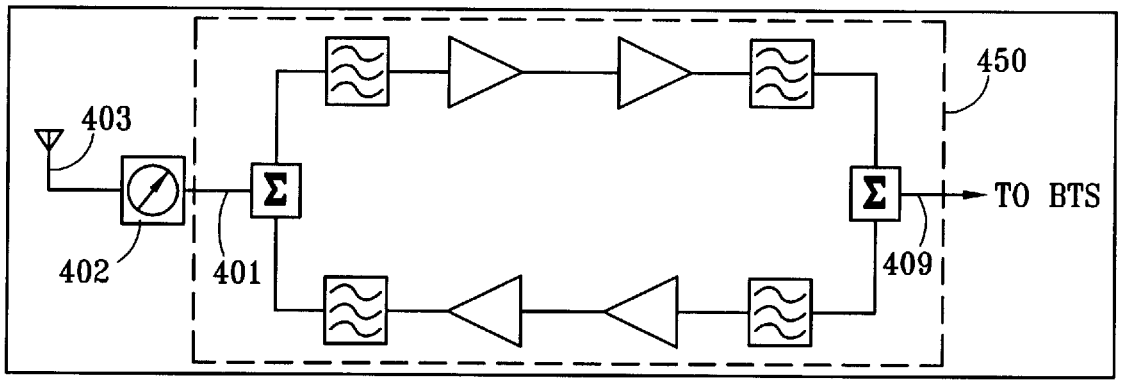
FIGS. 4e–4f illustrate alternative embodiments of the present invention.
Figure 4F:
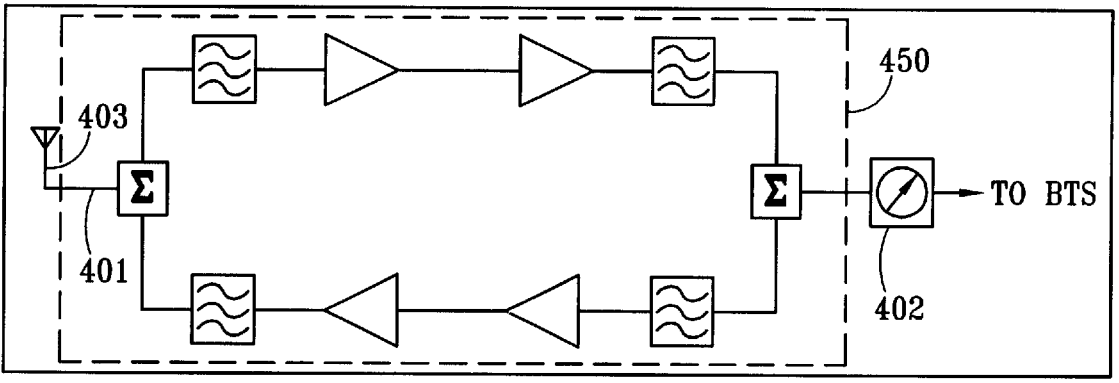

Now referring to FIGS. 4e and 4f, there are illustrated other embodiments of the present invention that include the delay generator 402 (similar to the delay generator described above) coupled to the input/output terminal 401 (i.e., coupled to the subscriber station side) of an RF repeater 450. The delay generator 402 may be added externally to the RF repeater 450 at any point in the communication channel (the forward path, the reverse path, or both). As will be appreciated, the delay generator 402 may be coupled to the input/output terminal 409 (i.e, coupled to the base station side of the RF repeater), or two delay generators may be coupled to each side of the RF repeater 450.

Now referring back to FIG. 3, the use of the RF repeater 300 in accordance with the present invention extends and improves the effective coverage area as illustrated. It also eliminates the need for a subscriber station moving from cell 202 to cell 204 to hard hand-off to the collocated base station 304 and then soft hand-off between the base station 304 and the base station 306. The hard hand-off process may occur directly between the base station 302 (operating at channel frequency $f_2$) and the base station 306 (operating at channel frequency $f_1$).

Figure 6:
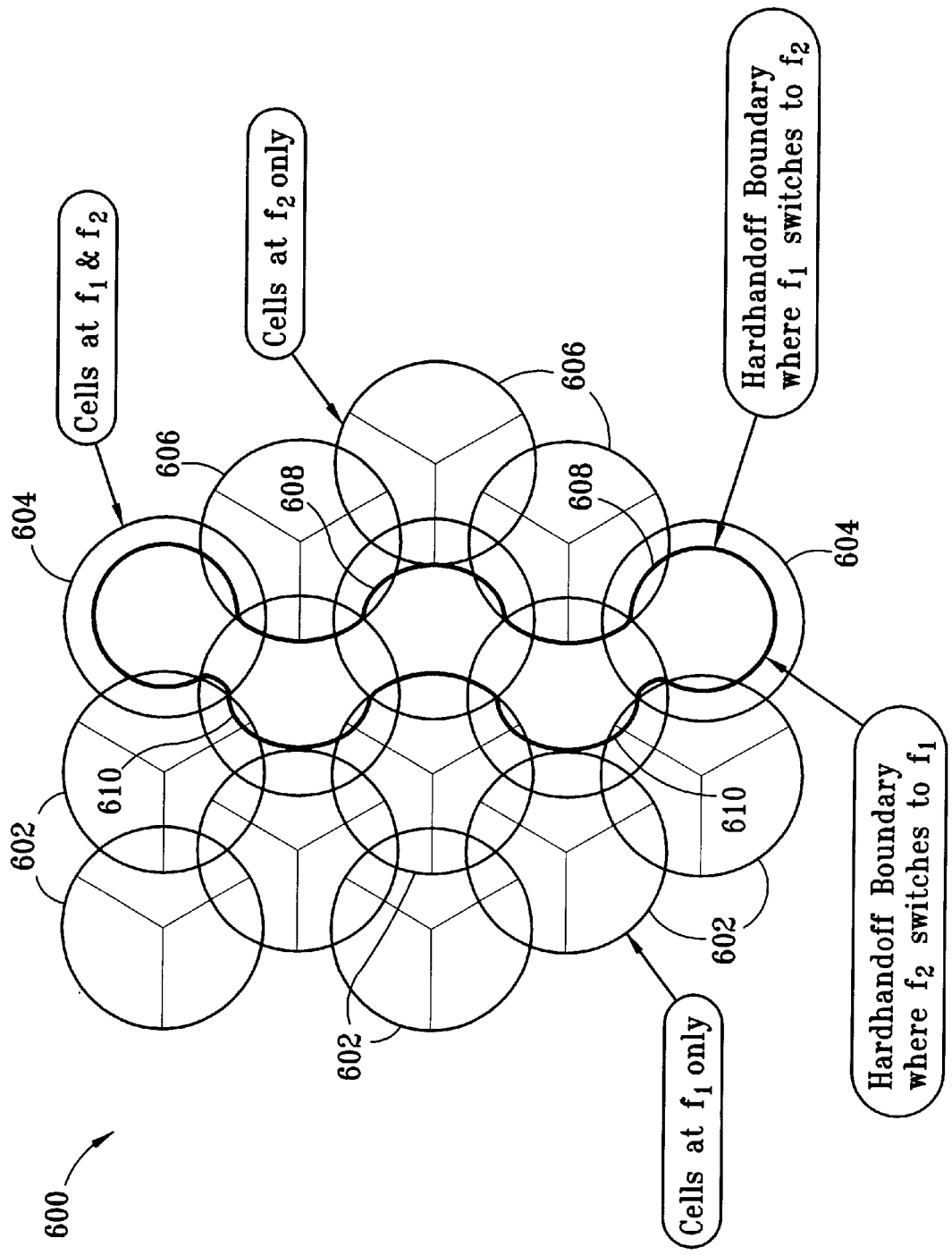
FIG. 6 is a diagram illustrating another example of a cell configuration.

Now referring to FIG. 6, there is shown an example of a different CDMA cell configuration 600 that may be utilized by a service provider. The configuration 600 includes a group of CDMA cells 602 (seven adjacent cells are illustrated) operating with channel frequency $f_1$. The group of cells 602 are bounded by a second group of cells 604 (five serpentine cells adjacent the group of cells 604 are illustrated) operating with channel frequencies $f_1$ and $f_2$. The channel frequency $f_1$ is ubiquitous within the coverage area defined by the cells 602 and 604. The group of cells 604 are bounded by a third group of cells 606 (three adjacent cells are illustrated) operating with channel frequency $f_2$. The channel frequency $f_2$ is ubiquitous within the coverage area defined by the cells 604 and 606. As will be appreciated, each of the cells 604 includes a first base station (not shown) operating at channel frequency $f_1$ and a second base station (not shown) operating at channel frequency $f_2$, while each of the cells 602 includes a base station (not shown) operating at channel frequency $f_1$ and each of the cells 606 includes a base station (not shown) operating at channel frequency $f_2$. It will be understood that all, some or none of the cells 602, 604, 606 may be provisioned for sectorized operation (e.g., bisector, trisector, etc.).

During operation, when a subscriber station operating at channel frequency $f_1$ within one of the cells 602, 604 moves toward one of the cells 606, it will eventually reach a hard hand-off boundary 608. As the subscriber station leaves the group of cells 604 and travels to one of the cells 606, a hard hand-off is needed whereby the subscriber station switches operation from channel frequency $f_1$ to channel frequency $f_2$. Likewise for a subscriber station operating at channel frequency $f_2$ traveling the opposite direction that eventually reaches a hard hand-off boundary 610. This typical hard hand-off process has been described in the Background section above, and further with reference to FIG. 1. It will be understood that the cell boundaries for each of the cells 602, 604, 606, and the hard-hand-off boundaries 608, 610, may slightly shift or change (are not static) resulting in coverage area(s) that may shrink or grow, depending on operating conditions.

Figure 7:
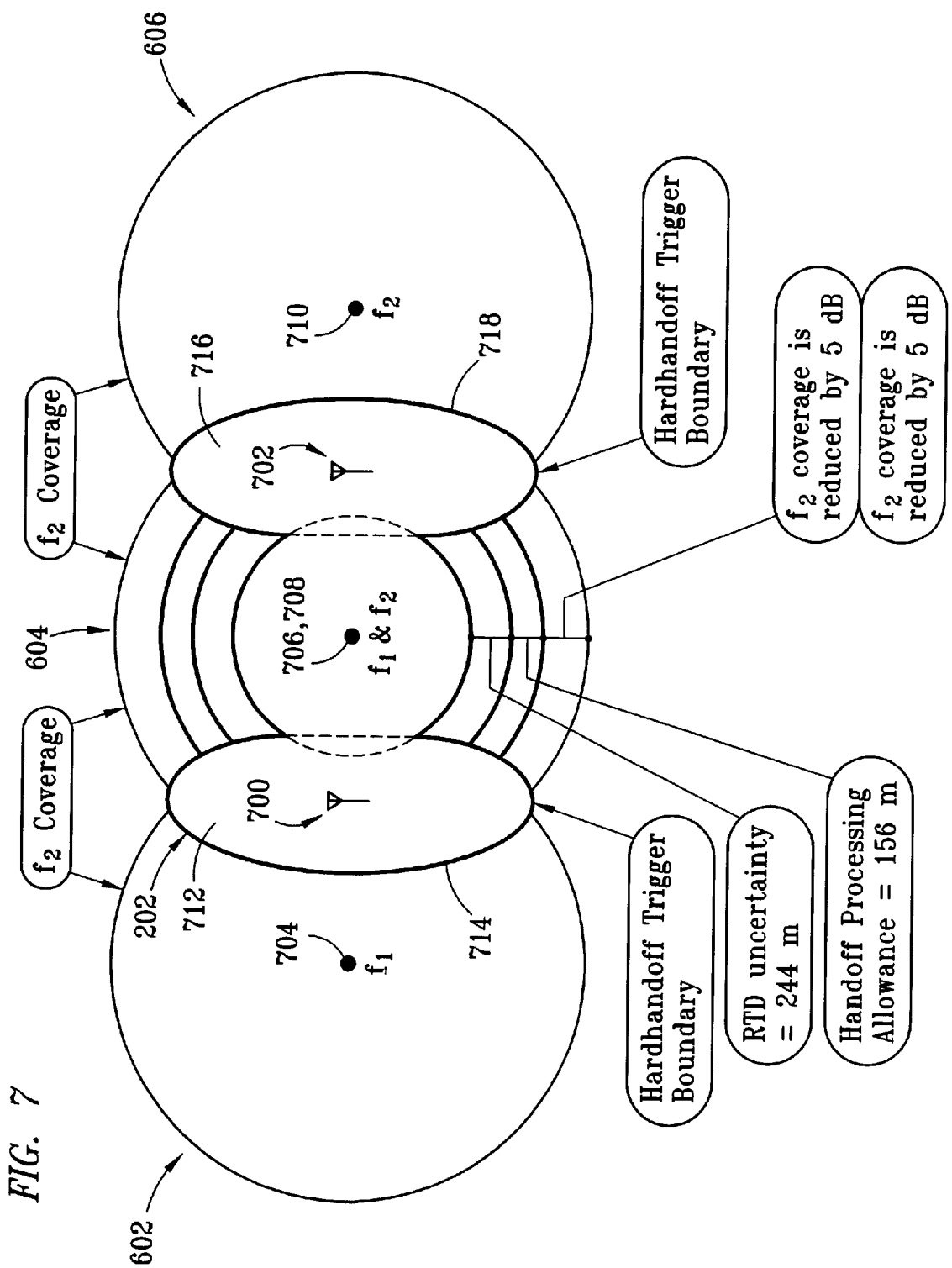
FIG. 7 is a more detailed diagram of three cells shown in FIG. 6.

Now referring to FIG. 7, there is illustrated one of the cells 604 (with its effective coverage areas, as illustrated in FIG. 1) and one of the cells 602 and one of the cells 606. FIG. 7 illustrates the use of an RF repeater 700 and an RF repeater 702 in accordance with the present invention when the cells are configured as illustrated in FIG. 6. Each of the RF repeaters 700, 702 includes a delay as set forth in FIGS. 4b–4d or 4e–4f and described in the accompanying text. The cell 602 includes a base station (BTS) 704 operating at channel frequency $f_1$. The cell 604 includes a first base station 706 operating at channel frequency $f_1$ and a second base station 708 operating at channel frequency $f_2$. The cell 606 includes a base station 710 operating at channel frequency $f_2$.

The RF repeater 700 operates in conjunction with the base station 708 (channel frequency $f_2$) and provides a coverage area 712. After taking into account the factors that reduce the coverage area of cell 604 during the hard hand-off process, the effective coverage area of the cell 604 with utilization of the RF repeater 700 is extended and defined by a boundary identified by reference numeral 714. Accordingly, use of the RF repeater 700 produces the hard hand-off boundary 714 between the cell 602 and the cell 604 at which the hard hand-off process (without requiring the intermediate soft hand-off to the collocated base station) will occur resulting in an increase in the effective coverage area of the cell 604, as illustrated in FIG. 7. This allows for the hard hand-off process to occur without the need for an intermediate soft hand-off to the collocated base station).

Similarly, the use of the RF repeater 702 in conjunction with the base station 706 (channel frequency $f_1$) provides a coverage area 716 and extends the effective coverage area of the cell 604 to that defined by a boundary identified by reference numeral 718.

The RF repeaters offset the problems incurred in the hard handoff process as explained previously. Boundary cell shrinkage due to high $E_b/N_o$ requirement, hard hand-off processing, and RTD uncertainties is alleviated. In fact, the RF repeaters increases the cell coverage area of cell 604 for both conditions when a subscriber station hard handoffs to the cell 602 or to the cell 606 from the cell 604. Subscriber stations operating through the RF repeaters 700, 702 can be identified and distinguished from those subscriber stations not operating through the RF repeaters 700, 702. Moreover, the repeater signal and direct signal can be identified and distinguished from each other by the base station from the time delay added to the repeater signal.

Figure 8:
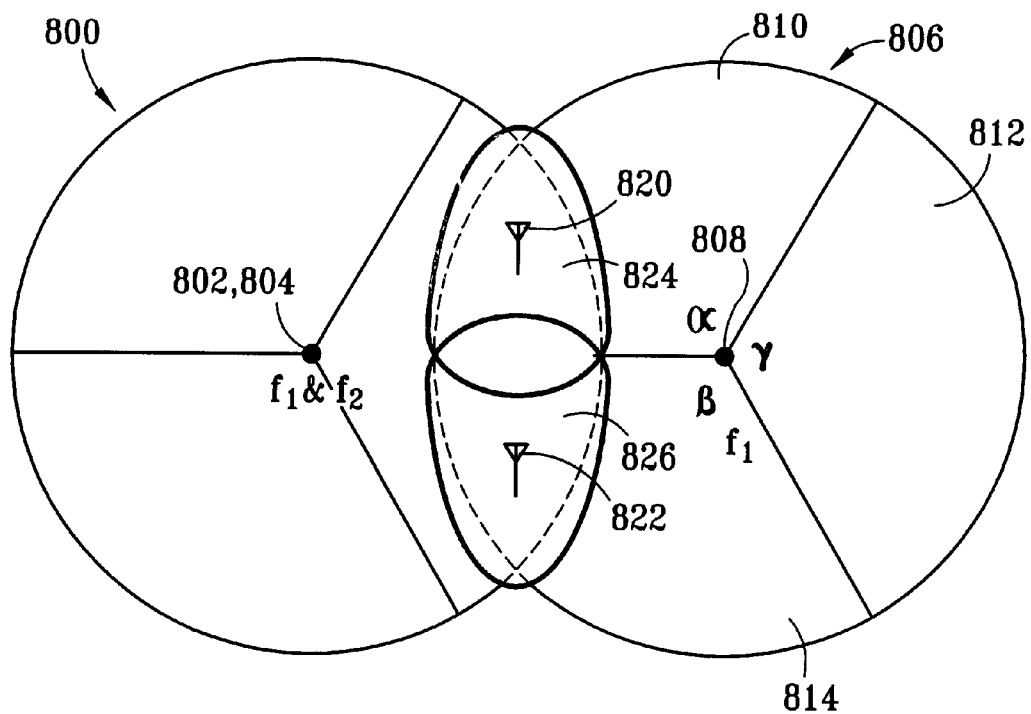
FIG. 8 illustrates the use of RF repeaters for hard hand-off between two unaligned and tri-sectored cells.

Now referring to FIG. 8, there is illustrated use of the present invention RF repeater for improving hard hand-off performance between two tri-sectorized and unaligned cells. This situation is very similar to that shown in FIG. 3 except the cells are tri-sectored and not aligned. The cell 800 includes a first BTS 802 operating at channel frequency $f_1$ and a second base station 804 operating at channel frequency $f_2$, while the cell 806 includes a base station 808 operating at channel frequency $f_1$. In addition, the cells 800, 806 operate in a tri-sector fashion however the sectors are unaligned. The cell 806 includes a sector α having coverage area 810, sector γ having coverage area 812 and sector β having coverage area 814.

In this example, two RF repeaters 820, 822 operating in conjunction with the base station 804 are deployed near the cell edge of the cell 800. The RF repeaters 820, 822 extend the $f_2$ cell boundary by operating to cover the areas 824 and 826, respectively. The RF repeaters 820, 822 each have different time delays which allows the base station 804 to determine the location of the subscriber station. When the subscriber station is in communication through the RF repeater 820, then the subscriber station will be hard handed to the α sector of the cell 806. In contrast, if the subscriber station is in communication through RF repeater 822, then the subscriber station will be hard handed to the β sector of the cell 806.

When the subscriber station is in communication to the base station 804 through both RF repeaters 820, 822, then the base station will identify the strongest delayed signal and hard hand-off the subscriber station to that sector of the cell 806 which is closest to the RF repeater having the strongest delayed signal. If the strength of the repeater signal received from the RF repeater 820 is greater than the strength of the repeater signal received from the RF repeater 822, the base station determines that the subscriber station is nearer to the RF repeater 820, and vice versa.

Using the RF repeaters 820, 822 eliminate the need for the subscriber station to handoff to the collocated base station 804. There are economical benefits to this type of handoff. Using the old hard hand-off method, the subscriber station is handed off to the collocated base station 804. In high traffic areas where the cell 800 uses two channel frequencies ($f_1$ an $f_2$), the $f_1$ channel frequency will be loaded with users. If the subscriber station is handed off to the collocated base station 804, then the capacity of the collocated base station will decrease. It is more advantageous to hand off the subscriber station to the adjacent cell 806 where there is less demand, than to hand off to the collocated base station 804 (and then soft hand-off to the cell 806). Using the RF repeaters of the present invention, a subscriber station may be hard handed off directly to an adjacent neighbor cell, without first handing off to a collocated base station.

In heavy traffic areas, such as the downtown area of a city, the signal delays are within 5 to 10 microseconds because the cells are relatively small. Because this delay is much smaller than the base station delay window (208 microseconds), then it is possible to use a number of RF repeaters, each having a specific amount of delay, as illustrated by FIG. 5b. A base station detects each delayed signal and uses it to locate the position of the subscriber station, which also identifies the RF repeater with which the subscriber station is in communication. From this, it may be determined to which adjacent cell and/or which sector of an adjacent cell the subscriber station should be hard handed off. As will be appreciated, the time delay mechanics of using two or more RF repeaters within a single cell with each RF repeater having a different delay is illustrated in FIG. 5b.

Figure 9A:
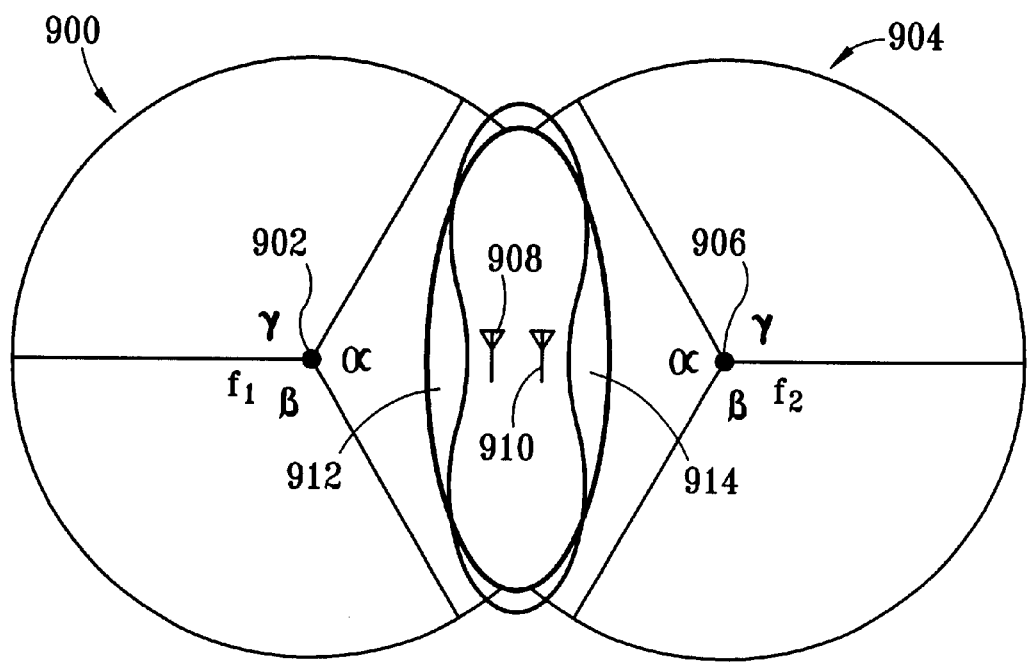
FIG. 9a illustrates two RF repeaters used in two aligned and tri-sectored cells each operating at a different channel frequency.

Now referring to FIG. 9a there is illustrated use of the present invention RF repeaters for improving hard hand-off performance between two tri-sectorized and aligned cells which operate at different channel frequencies. A cell 900 includes a first BTS 902 operating at channel frequency $f_1$ and a cell 904 includes a base station 906 operating at channel frequency $f_2$. In addition, the cells 900, 904 operate in a tri-sector fashion with the sectors aligned. Each cell includes a sector α, a sector γ and a sector β.

A first RF repeater 908 operating in conjunction with the base station 902 is deployed near the cell edge of the cell 900. The RF repeater 908 extends the $f_1$ cell boundary by operating to cover the area 914. Another RF repeater 910 operating in conjunction with the base station 906 is deployed near the cell edge of the cell 904. The RF repeater 910 extends the $f_2$ cell boundary by operating to cover the area 912. Each of the RF repeaters 908, 910 includes an added delay. As will be appreciated, this same configuration would be utilized if the cells 900 and 904 were in an omni-cell deployment (single sectors).

As described earlier, the typical hard hand-off process requires the utilization of a collocated base station operating at the same frequency channel as the destination cell. However, the use of RF repeaters with delays in accordance with the present invention allows hard hand-offs between cells operating at different channel frequencies. This eliminates the need for an additional collocated base station within one of the cells. As will be appreciated, an RF repeater costs substantially less than a base station, on the order of one-twentieth the cost of a base station. Moreover, RF repeaters are very small in size and may be mounted on a mast in a highway road at or near the antennas themselves.

Figure 9B:
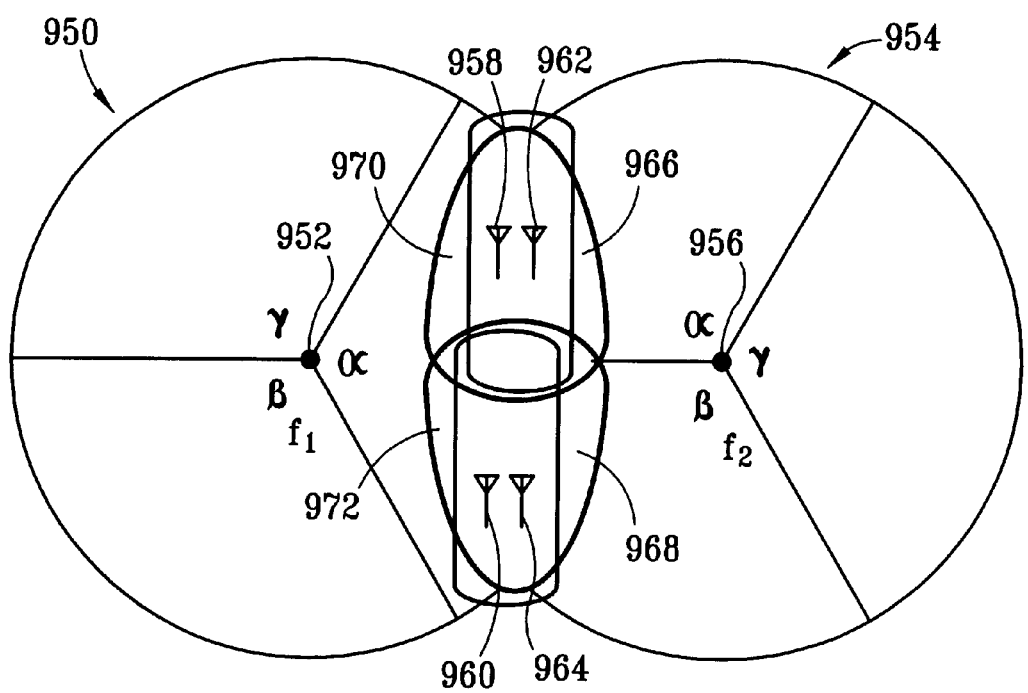
FIG. 9b illustrates four RF repeaters used in two unaligned and tri-sectored cells each operating at a different channel frequency.

Now referring to FIG. 9b there is illustrated essentially the same configuration as illustrated in FIG. 9a except the sectorized cells are not aligned. This requires the use of four RF repeaters to improve the hard hand-off performance between cells operating at different channel frequencies.

A cell 950 includes a first BTS 952 operating at channel frequency $f_1$ and a cell 954 includes a base station 956 operating at channel frequency $f_2$. In addition, the cells 950, 954 operate in a tri-sector fashion with the sectors not aligned. Each cell includes a sector α, a sector γ and a sector β.

The cell 950 includes a first RF repeater 958 and a second RF repeater 960 operating in conjunction with the base station 952 and are deployed near the cell edge of the cell 950. The RF repeaters 958, 960 extend the $f_1$ cell boundary by operating to cover the areas 966 and 968, respectively. The cell 954 includes a first RF repeater 962 and a second RF repeater 964 operating in conjunction with the base station 956 and are deployed near the cell edge of the cell 954. The RF repeaters 962, 964 extend the $f_2$ cell boundary by operating to cover the areas 970 and 972, respectively. Each of the RF repeaters 958, 960, 962, 964 includes an added delay whereby the RF repeaters 958 and 960 each have a delay that is different from the other and the RF repeaters 962 and 964 each have a delay that is different from the other.

An example of the configuration illustrated in FIG. 9b is where there is a highway between two cities or MTAs. Since the cell layout is such that the sectors are not properly aligned, a total of four RF repeaters are needed (two per carrier) in this example. This ensures that the subscriber station handoffs from the cell 950 to the appropriate sector of the cell 954 (the α or β sector) and, if traveling the other direction, the subscriber station handoffs from the α sector or the β sector of the cell 954 the cell 950.

As will be appreciated, the RF repeaters with delays may be similarly used to improve the hard hand-off performance for a hard hand-off from a CDMA cell to an AMPS (FDMA, TDMA) cell or other cell having a different channel frequency.

It will be understood that the number of RF repeaters and the place of deployment (i.e. which cells) depends primarily on the demand for service and current deployment of channel frequencies. At certain cell boundaries where the demand for service is high, a service provider may desire to deploy RF repeaters to extend the coverage area in order to make use of the BTS capacity capability.

The present invention provides an RF repeater having a fixed or adjustable time delay inserted in the reverse path and/or forward path. The inherent delay present in an RF repeater may be sufficient such that no additional time delay need be added (the inherent delay in an RF repeater is about four to five microseconds). Use of such an RF repeater near the boundary of a cell the improves the hard hand-off performance. The time delay may be added to both paths. Preferably, the time delay is added to the reverse path because of the relatively large search window of the base station. The amount of the delay may be adjusted based on the cell site requirement. The time delay of the signal is used to distinguish the location of the subscriber station as well as the RF repeater itself. The reverse path delay allows use of a delay up to 208 microseconds. This provides the capability of deploying more than one RF repeater per cell (each such RF repeater is designed to have a different delay, thus distinguishing each RF repeater).

In some cases, the inherent delay present in an RF repeater may be sufficient such that no additional time delay need be added. The typical inherent delay in each path of the RF repeater is about five microseconds, giving a total inherent delay of about ten microseconds. The base station may utilized the inherent delay of the RF repeater to distinguish the signal coming from the RF repeater.

The RF repeater operates as a cell extender, which extends the cell boundary. It compensates for the 400 meter margin that is required for the hard hand-off process (RTD uncertainties and hard hand-off processing). It also effectively eliminates the approximately 5 dB reduction in the cell coverage area. Use of the RF repeater also improves the forward link capacity of the base station by allowing the subscriber station near the cell to communicate with the BTS at lower transmit power. Even with the cell extension, there is no impact on the surrounding cells which operate at a different channel frequency.

Use of the RF repeater in accordance with the present invention eliminates the need for bi-sector cells in inter-cell deployment conditions resulting in a cost savings. Moreover, a hard hand-off to a collocated BTS is eliminated thereby improving the capacity and the loading of the system and decreasing costs. In addition, RF repeaters may be used to improve the hard hand-off performance for a hard hand-off from CDMA to AMPS (FDMA, TDMA) or GSM.

The advantages of using an RF repeater having a delay are also obtained in the hand-off process in FDMA, TDMA, GSM technology, or in any system where the hand-off process requires a subscriber station to switch from one channel frequency to another channel frequency while moving from one cell to another cell (i.e. the cells are operating at different channel frequencies).

Although the present invention and its advantages have been described in the foregoing detailed description and illustrated in the accompanying drawings, it will be understood by those skilled in the art that the invention is not limited to the embodiment(s) disclosed but is capable of numerous rearrangements, substitutions and modifications without departing from the spirit and scope of the invention as defined by the appended claims.

What is claimed is:

1. A radio frequency (RF) base station and repeater system for assisting in the hand-off of a subscriber station from the base station, comprising:
    (a) a repeater, further comprising input means for receiving a first signal from a subscriber station, the subscriber station being within a first cell containing at least one base station;
        means for delaying the first signal by a predetermined amount of time; and
        means for outputting the delayed first signal for transmission to the at least one base station, the delayed first signal being used to permit the subscriber station to be handed off to a second cell; and
    (b) the at least one base station, further comprising:
        means for receiving the delayed first signal;
        means for recognizing the predetermined amount of time that the first signal is delayed; and
        means for identifying the repeater from which the signal was received by the recognized predetermined delay.

2. An RF repeater in accordance with claim 1 wherein the means for delaying the first signal comprises a delay generator.

3. An RF repeater in accordance with claim 1 wherein the predetermined amount of time is adjustable.

4. An RF repeater in accordance with claim 1 further comprising:
    means for receiving a second signal from the base station; and
    means for delaying the second signal.

5. An RF repeater in accordance with claim 4 wherein the means for delaying the second signal comprises a delay generator.

6. An RF repeater in accordance with claim 1 wherein the cell operates using code division multiple access (CDMA) communications.

7. A radio frequency (RF) repeater comprising:
    input means for receiving a first signal from a base station located in a first cell;
    means for delaying the first signal by a predetermined amount of time, the predetermined amount of time of the delay identifiable by at least one base station in the first cell as identifying the repeater; and
    means for outputting the delayed first signal for transmission to a subscriber station, the subscriber station being within the first cell and the predetermined amount of time delay of the delayed first signal being used to identify the repeater and thereby permit the subscriber station to be handed off to a second cell.

8. An RF repeater in accordance with claim 7 wherein the means for delaying the first signal comprises a delay generator.

9. An RF repeater in accordance with claim 7 wherein the predetermined amount of time is adjustable.

10. An RF repeater in accordance with claim 7 further comprising:
    input means for receiving a second signal from the subscriber station; and
    means for delaying the second signal by a predetermined amount of time.

11. An RF repeater in accordance with claim 10 wherein the means for delaying the second signal comprises a delay generator.

12. An RF repeater in accordance with claim 7 wherein communications between the subscriber station and the base station are code division multiple access (CDMA) communications.

13. An apparatus for delaying an radio frequency (RF) signal between a subscriber station and a base station comprising:

an RF repeater, operable with a base station within a first cell, for receiving an RF signal from a subscriber station and for transmitting the RF signal to the base station; and means, electrically coupled to the RF repeater, for delaying the RF signal by a predetermined amount of time, the predetermined amount of time of the delay identifying the repeater to the base station with which the repeater operates, the delayed first signal being used to permit the subscriber station to be handed off to a second cell.

14. An apparatus in accordance with claim 13 wherein the means for delaying the RF signal comprises a delay generator.

15. An apparatus in accordance with claim 13 wherein the predetermined amount of time is adjustable.

16. An RF repeater in accordance with claim 13 wherein the RF repeater receives a second RF signal from the base station and transmits the second RF signal to the subscriber station, and the means for delaying delays the second RF signal by a predetermined amount.

17. An RF repeater in accordance with claim 13 wherein communications between the subscriber station and the base station are code division multiple access (CDMA) communications.

18. An apparatus for delaying a radio frequency (RF) signal between a subscriber station and a base station comprising:

an RF repeater, operable with a base station within a first cell, for receiving an RF signal from the base station and for transmitting the RF signal to a subscriber station; and means, electrically coupled to the RF repeater, for delaying the RF signal by a predetermined amount of time, the predetermined amount of time of the delay identifying the repeater to the subscriber station, the delayed RF signal being used to permit the subscriber station to be handed off to a second cell.

19. An apparatus in accordance with claim 18 wherein the means for delaying the RF signal comprises a delay generator.

20. An RF repeater in accordance with claim 19 wherein communications between the subscriber station and the base station are code division multiple access (CDMA) communications.

21. A communications cell utilizing CDMA technology, comprising:

a first cell having a base station emitting a base station signal for communicating with a subscriber station within a predetermined geographic area, the subscriber station emitting a first signal; and a radio frequency (RF) repeater operable with the base station and located proximate a boundary of the predetermined geographic area, the RF repeater comprising, input means for receiving a first signal from the subscriber station, means for delaying the first signal by a predetermined amount of time, and means for outputting the delayed first signal for transmission to the base station, the predetermined amount of time of the delay of the transmission being recognized by the base station as identifying the repeater, the delayed first signal being used to permit the subscriber station to be handed off to a second cell.

22. A communications cell in accordance with claim 21 wherein the base station receives the delayed first signal from the RF repeater and determines from the delayed first signal that the subscriber station is proximate a second cell having a base station operating at a frequency different from the frequency of operation of the base station of the first cell.

23. communications cell in accordance with claim 21 wherein the base station receives the first signal from subscriber station and initiates a process for handing off the subscriber station from the first cell to the second cell when the signal strength of the received delayed first signal exceeds the signal strength of the received first signal.

24. A method of improving hand-off performance from a first cell to a second cell, comprising the steps of:

receiving at a radio frequency (RF) repeater a first CDMA signal from a subscriber station, the repeater being operable with a base station and located near a cell boundary of the first cell;

delaying the first CDMA signal by a predetermined amount of time; and outputting the delayed first CDMA signal for transmission to the base station; and the predetermined amount of time of the delay of the first signal being used to provide information to the base station concerning the location of the subscriber station, thereby the delayed first signal being used to permit the subscriber station to be handed off to the second cell.

25. A method in accordance with claim 24 further comprising the step of determining from the delayed first signal that the subscriber station is located proximate the second cell having a base station operating at a frequency different from the frequency of operation of the base station of the first cell.

26. A method in accordance with claim 24 further comprising the steps of:

receiving at the base station the first signal from the subscriber station;

receiving at the base station the delayed first signal from the RF repeater; and initiating a process for handing off the subscriber station from the first cell to the second cell when the signal strength of the received delayed first signal exceeds the signal strength of the received first signal, wherein the delay of the first signal is used to provide information concerning the location of the subscriber station.

27. A method in accordance with claim 26 wherein communications between the subscriber station and the base station are code division multiple access (CDMA) communications.

28. An apparatus for improving hand-off performance from a first cell to a second cell, comprising the steps of:

means for receiving at a radio frequency (RF) repeater operable with a base station a first signal from a subscriber station;

means for delaying the first signal by a predetermined amount of time; and means for outputting the delayed first signal for transmission to the base station, the predetermined amount of time of the delay of the first signal being used to provide information to the base station concerning the location of the subscriber station and the delayed first signal being used to permit the subscriber station to be handed off from the first cell to the second cell.

29. A method of defining the location of a subscriber station located within a cell or near the boundary of the cell, comprising the steps of:

receiving at a radio frequency (RF) repeater operable with a base station of the cell a first signal from a subscriber station;

delaying the first signal by a predetermined amount of time;

outputting the delayed first signal for transmission to the base station;

receiving at the base station the delayed first signal from the RF repeater; and determining from the predetermined amount of time of the signal delay the identity of the repeater, thereby deriving the location of the subscriber station from the received delayed first signal.

30. A method of increasing the effective coverage of a cell for hard hand-offs, comprising the steps of:

deploying a radio frequency (RF) repeater proximate the cell boundary of the cell, the RF repeater operable with a base station located within the cell;

receiving at the RF repeater a first signal from a subscriber station;

delaying the first signal by a predetermined amount of time; and outputting the delayed first signal for transmission to the base station;

receiving at the base station the delayed first signal from the RF repeater; and measuring the delayed first signal to determine the location of the repeater, the subscriber station and whether a hand-off should be performed, thereby increasing the effective coverage area of the cell.

31. A method of communicating with a subscriber station located proximate the boundary of a cell, comprising the steps of:

receiving at a radio frequency (RF) repeater operable with a base station within the cell a first signal from a subscriber station;

delaying the first signal by a predetermined amount of time, the predetermined amount of time identifying the repeater to the base station;

outputting the delayed first signal for transmission to the base station; and determining the location of the subscriber station using the delay of the first signal.

32. A radio frequency (RF) repeater comprising:

input means for receiving a first signal transmitted by a subscriber station directly to a base station, the subscriber station being within a cell containing the base station;

means for delaying the first signal by a predetermined amount of time $t_1$ associated with the repeater; and means for transmitting the delayed first signal to the base station, the predetermined amount of time $t_1$ being determined by the base station and used to identify the repeater and determine the approximate location of the subscriber station.

* * * * *